(12) United States Patent
Epting

(10) Patent No.: US 9,277,847 B2
(45) Date of Patent: Mar. 8, 2016

(54) HANDHELD TOOL FOR REMOVING MATTER FROM CREVICES

(71) Applicant: Everette Harold Epting, Santa Rosa, CA (US)

(72) Inventor: Everette Harold Epting, Santa Rosa, CA (US)

( * ) Notice: Subject to any disclaimer, the term of this patent is extended or adjusted under 35 U.S.C. 154(b) by 0 days.

(21) Appl. No.: 14/583,480

(22) Filed: Dec. 26, 2014

(65) Prior Publication Data

US 2015/0182091 A1     Jul. 2, 2015

Related U.S. Application Data

(60) Provisional application No. 61/920,909, filed on Dec. 26, 2013.

(51) Int. Cl.
*A47L 13/08* (2006.01)
*A01B 1/20* (2006.01)

(52) U.S. Cl.
CPC .. *A47L 13/08* (2013.01); *A01B 1/20* (2013.01)

(58) Field of Classification Search
CPC .......... A47L 17/06; A47L 13/08; A01B 1/12; A01B 1/20; A01G 3/06; E01H 1/12
See application file for complete search history.

(56) References Cited

U.S. PATENT DOCUMENTS

| | | | | | |
|---|---|---|---|---|---|
| 88,051 | A | * | 3/1869 | Lowe | 172/375 |
| 1,266,921 | A | * | 5/1918 | Cremers | 172/372 |
| 1,473,143 | A | * | 11/1923 | Dean | 15/236.01 |
| 2,018,591 | A | * | 10/1935 | Angel | 172/375 |
| 2,535,253 | A | * | 12/1950 | Anderson | 30/128 |
| 2,824,323 | A | * | 2/1958 | Oreste Tos et al. | 15/105 |
| 2,827,697 | A | * | 3/1958 | Woodel | 30/293 |
| 3,048,139 | A | * | 8/1962 | Duckett | 114/221 R |
| 3,110,054 | A | * | 11/1963 | Askew, Sr. | 15/236.01 |
| 4,790,388 | A | * | 12/1988 | Badham | 172/375 |
| 4,890,679 | A | * | 1/1990 | Jacobs | 172/371 |
| 5,471,696 | A | * | 12/1995 | Linfoot | 15/104.001 |
| 5,666,683 | A | * | 9/1997 | Gairdner | 15/104.001 |
| 6,205,608 | B1 | * | 3/2001 | Bowen | 15/104.001 |
| 6,757,928 | B2 | * | 7/2004 | Lee | 15/104.001 |
| D698,619 | S | * | 2/2014 | Schnabel | D8/11 |
| 2015/0096137 | A1 | * | 4/2015 | Kayler | 15/144.4 |

* cited by examiner

*Primary Examiner* — Randall Chin
(74) *Attorney, Agent, or Firm* — Mark H. PLager, Esq.

(57) ABSTRACT

Some embodiments of the present disclosure include a handheld tool for removing debris from a crevice. The tool may include a handle shank having a proximal end and a distal end, and a generally anchor-shaped dislodging body extending from the distal end of the handle shank. The dislodging body may have a fulcrum aperture configured to permit the passage of a fulcrum apparatus therethrough along with a distal end and two blade portions extending outwardly from the distal end of the dislodging body and a punch extending from the distal end of the anchor-shaped dislodging body, the punch configured to push debris through the crevice. The punch may include a pair of picks, such as a sharp pick and a flat pick, extending therefrom and a beveled outer edge configured to function as a scraper.

6 Claims, 4 Drawing Sheets

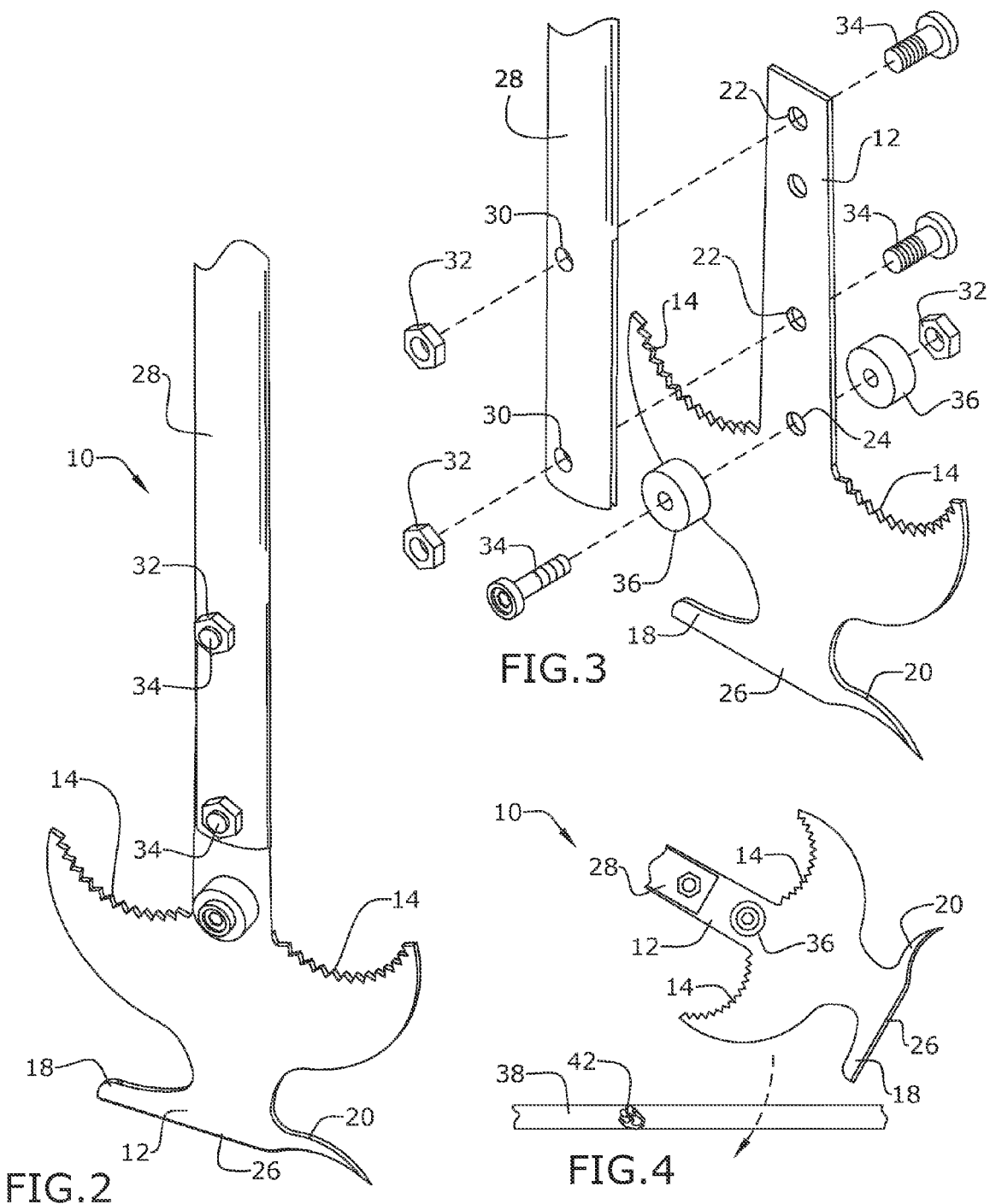

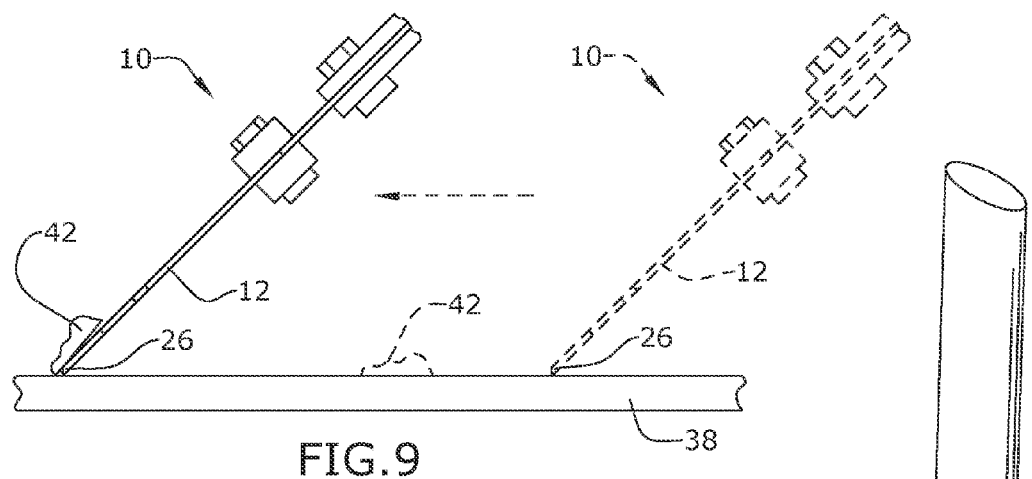
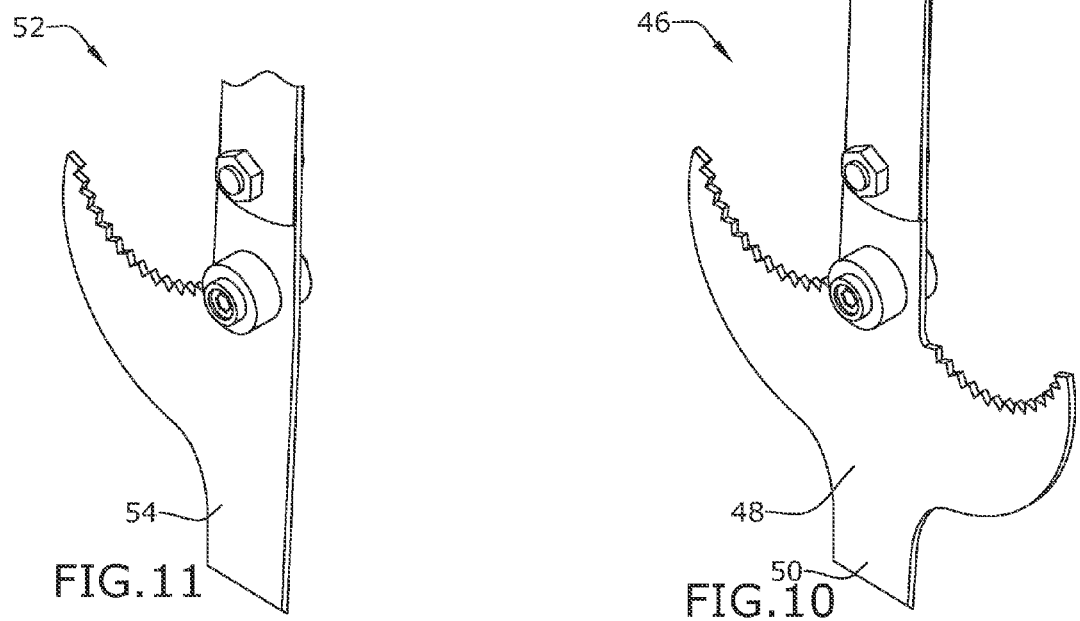

HANDHELD TOOL FOR REMOVING MATTER FROM CREVICES

RELATED APPLICATION

This application claims priority to provisional patent application U.S. Ser. No. 61/920,909 filed on Dec. 26, 2013, the entire contents of which is herein incorporated by reference.

BACKGROUND

The embodiments described herein relate generally to tools, and more particularly, to a tool for dislodging matter from crevices.

Often times, when boards, such as wooden boards or synthetic boards, are used to construct a deck or other surface, the boards are spaced apart such that there is a crevice between adjacent boards. Debris is capable of becoming lodged in these crevices between boards. For example, rocks, seeds, dirt, sticks, or even small toys could become stuck in the crevices between the boards. In order to slow the breakdown of wooden decks, help prevent rotting of the decks, and beautify the deck, this debris needs to be removed from the crevices. Some typical ways of removing the debris, includes using high-pressure water from a hose or even tools such as a sawsall. However, water pressure alone may not force out all debris, and using a sawsall for this task may be dangerous. Other tools that have been designed to remove debris from crevices are small and do not provide multitask functions, necessitating the purchase of multiple tools.

Therefore, what is needed is a handheld tool, which is capable of performing multiple functions, to enable a user to effectively remove debris from crevices.

SUMMARY

Some embodiments of the present disclosure include a handheld tool for removing debris from a crevice. The tool may include a handle shank having a proximal end and a distal end, and a generally anchor-shaped dislodging body extending from the proximal end of the handle shank. The generally anchor-shaped dislodging body has a fulcrum aperture configured to permit the passage of a fulcrum apparatus there through for creating a fulcrum point when the tool is in use. The dislodging body may have a distal end and two blade portions extending outwardly from the distal end of the dislodging body and a punch extending from the distal end of the anchor-shaped dislodging body, the punch configured to push debris through the crevice. The punch may include a pair of picks, such as a sharp pick and a flat pick, extending therefrom and a beveled outer edge configured to function as a scraper.

BRIEF DESCRIPTION OF THE FIGURES

The detailed description of some embodiments of the invention is made below with reference to the accompanying figures, wherein like numerals represent corresponding parts of the figures.

FIG. 2 is a perspective view of one embodiment of the present invention.

FIG. 3 is an exploded detail view of one embodiment of the present invention.

FIG. 4 is a side view of one embodiment of the present invention.

FIG. 9 is a side view of one embodiment of the present invention.

FIG. 10 is a perspective view of one embodiment of the present invention.

FIG. 11 is a perspective detail view of one embodiment of the present invention.

DETAILED DESCRIPTION OF CERTAIN EMBODIMENTS

Figure 1:
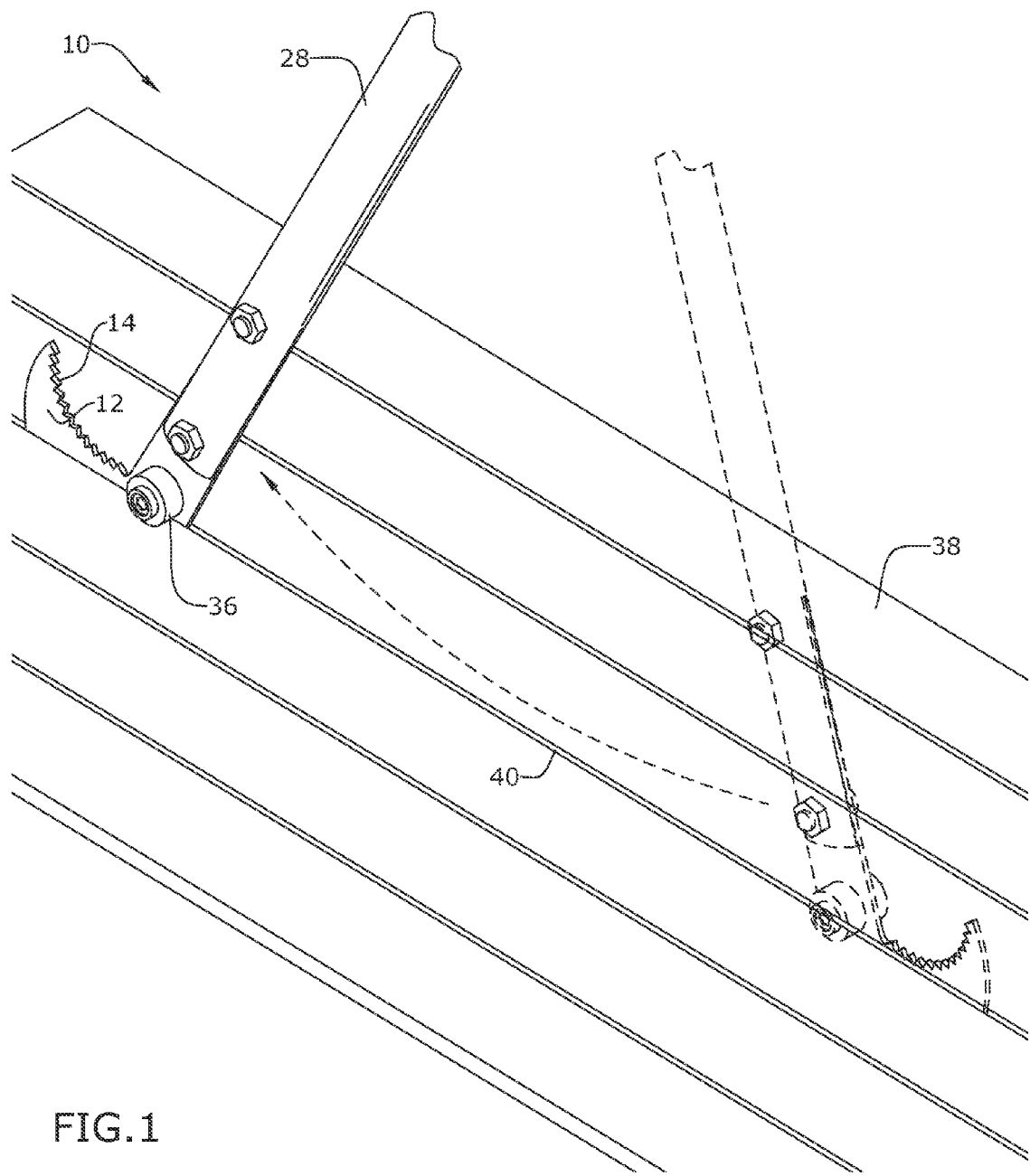
FIG. 1 is a perspective view of one embodiment of the present invention, shown in use.
Figure 5:
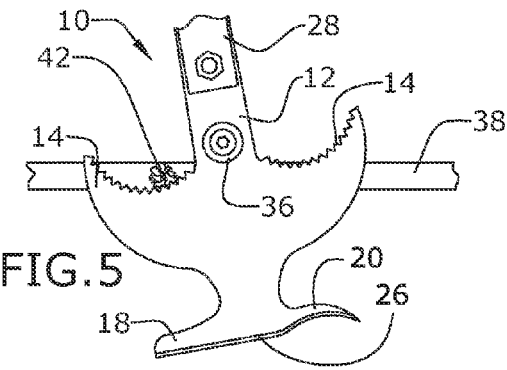
FIG. 5 is a side view of one embodiment of the present invention.
Figure 6:
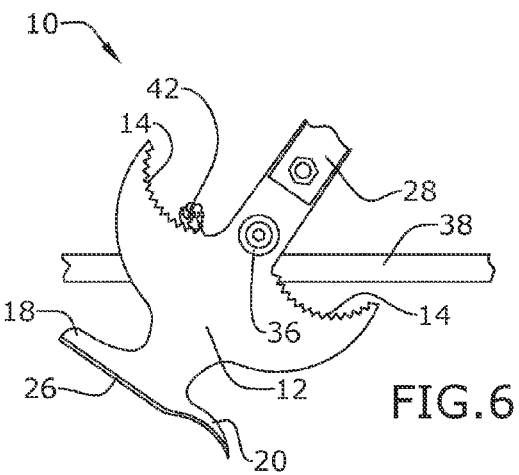
FIG. 6 is a side view of one embodiment of the present invention.
Figure 7:
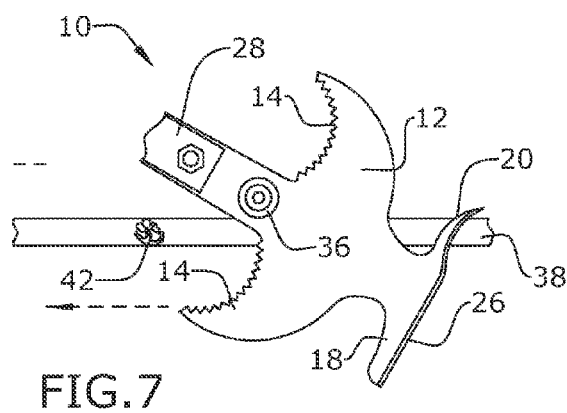
FIG. 7 is a side view of one embodiment of the present invention.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to remove debris from crevices and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

5. Handle Shank
6. Fulcrum Apparatus
7. Dislodging Body
8. Punch

The various elements of the handheld tool for dislodging debris from crevices of the present disclosure may be related in the following exemplary fashion. It is not intended to limit the scope or nature of the relationships between the various elements and the following examples are presented as illustrative examples only.

By way of example, and referring to FIGS. 1-10, some embodiments of the handheld tool 10 of the present disclosure comprise a handle shank 28 attached to a dislodging body 12, the dislodging body 12 comprising a plurality of blades, at least one of which has a serrated surface, and a punch extending therefrom, wherein the handheld tool 10 is configured to aid in removing debris 42 from the space 40 between decking planks 38. In some embodiments, as shown in FIG. 10, the tool 46 may comprise a dislodging body 48 that has a punch 50 that is substantially squared-off in shape, while in other embodiments, such as those shown in FIGS. 2-8, the dislodging portion 12 may comprise a punch having a bottom blade 26 comprising at least one pick, such as a flat pick 18 and a sharp pick 20. In some embodiments, the bottom blade 26 may comprise both a flat pick 18 and a sharp pick 20, as shown in FIGS. 1-8. As shown in FIG. 9, the bottom blade 26 (or the punch 50) may comprise a beveled edge configured to be used to scrape debris 42 off of a surface.

As shown in FIGS. 1-10, the handheld tool 10 of the present disclosure may be substantially anchor-shaped having a dislodging body 12 with two upwardly concave blades 14. Alternatively, as shown in FIG. 11, the handheld tool 52 may have a dislodging body 54 that is shaped like half of an anchor, having only one upwardly concave blade. The handle shank 28 may be substantially rectangular in shape and, in some embodiments, may taper in thickness from a portion proximal to the dislodging body 12 to an end distal from the dislodging body 12. In other embodiments, the handle shank 28 may have a substantially uniform thickness along its entire length. Moreover, in some embodiments, the handle shank 28 may be rounded rather than squared-off such that the handle shank 28 is more comfortable in a user's hand. In embodiments, the handle shank 28 may be attached to the dislodging body 12 using, for example, a plurality of bolts 34 and nuts 32, the bolts 34 configured to engage with a handle mount orifice 30 and a mount orifice 22. In other embodiments, the handle 28 may be a singular piece with the dislodging body 12, such that the handle 28 is not removable from the dislodging body 12. In either case, the tool 10 may further comprise a handle covering attached to the handle shank 28, wherein the cover may comprise a wooden or fiberglass material. The handle 28 may have any size and, in some embodiments, may be about 5.5 inches long and about 1.2 inches wide.

As shown in the figures, the handheld tool 10 may further comprise a fulcrum 36 rotatably attached to the dislodging body 12 positioned proximate to the proximal end of the handle 28. For example, the fulcrum 36 may extend through a fulcrum orifice 24 in the dislodging body 12, wherein the fulcrum orifice 24 is aligned with a center of the width of the handle 28. In some embodiments, the fulcrum 36 may simply comprise a dowel. In other embodiments, the fulcrum 36 may comprise a pair of rollers removably secured within the fulcrum orifice 24 using a bolt 34 and a nut 32. Thus, the fulcrum 36 may be removable and replaceable. In embodiments, the fulcrum 36 may function as a pivot, roller, and/or a stopper when the tool 10 is used to punch debris 42 downward. The fulcrum 36 may be made of any suitable material, and in some embodiments comprises a plastic, wooden, or metal dowel or a nylon roller.

In embodiments and as shown in FIGS. 1-10, extending from the handle 28 may be an anchor-shaped dislodging body 12 comprises at least two dislodging blades 14, such that the two dislodging blades 14 extend outwardly from the dislodging body 12, each dislodging blade 14 having a concave, curved surface curving upwardly toward the proximal end of the handle 28 and an upward tip. In some embodiments, at least one of the dislodging blades 14 comprises a serrated blade 14, wherein the curved surface of blade is serrated, and at least one of the dislodging blades comprises a non-serrated blade. In other embodiments, both blades 14 may be serrated or both blades 14 may be non-serrated. The distance between each of the upward facing tips may be, for example, about 5¾ inches. As mentioned above, alternate embodiments of the invention, such as the dislodging body 54 shown in FIG. 11, may only have one dislodging blade 14 extending outwardly therefrom, wherein the blade 14 may be serrated or non-serrated, wherein the dislodging body 54 resembles half of an anchor-shape.

Embodiments of the handheld tool 10 comprise a punch 50 extending from a distal end of the dislodging body 12. In some embodiments, the punch 50 may be squared-off, as shown in FIG. 10. In other embodiments, such as those shown in FIGS. 2-8, the punch extends outwardly in the width direction, wherein a first side and/or a second side of the punch comprises a pick. For example, the punch may comprise both a sharp pick 20 and a flat pick 18. The sharp pick 20 may have a downwardly oriented tip or an upward pick. In embodiments, the outer edge of the punch may be beveled, such that the punch is configured to function as a scraper.

The tool 10 of the present disclosure may be made of any suitable material. In some embodiments, the tool 10 is either stamped or cut from stainless steel. Embodiments of the device include a dislodging body 12 that is thin enough to be capable of fitting within crevices 40, such as those between decking boards 38. For example, the dislodging body 12 may be from about 1 mm to about 2 mm thick.

Figure 8:
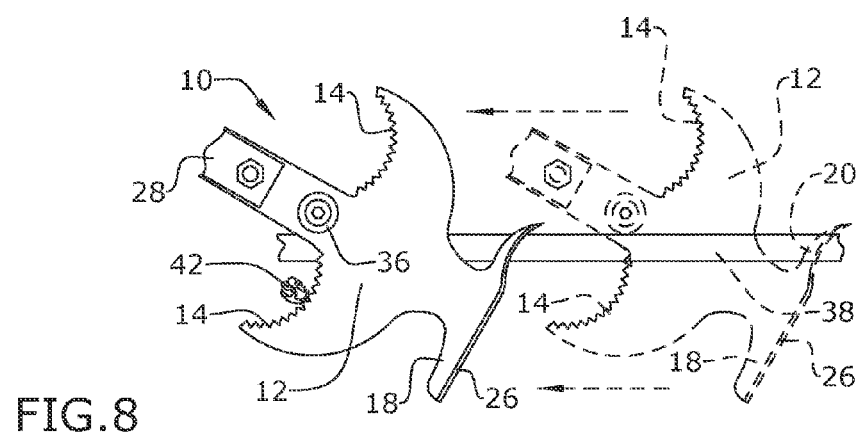
FIG. 8 is a side view of one embodiment of the present invention.

The tool 10 may be used to remove debris 42 positioned within crevices 40, such as debris lodged between decking boards 38. For example, the punch end of the device may be inserted into the crevice 40 between decking boards 38 to force debris 42 downward out of the crevice 40. The fulcrum 36 may stop the tool 10 from being inserted too far into the crevice 40. The tool may then be pivoted about the fulcrum 36 to remove additional debris 42, as shown in FIG. 1, or may be dragged along the crevice 40, as shown in FIG. 8 to dislodge debris 42 from the crevice 40. In embodiments, the serrated blade 14 may be used to saw through tough to remove material and the upward and downward picks 18, 20 may assist in picking materials out of the crevice 40. The beveled edge may be used to scrape material from the boards 38.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A handheld tool for removing debris from a crevice, the tool comprising:
   a handle shank having a proximal end and a distal end; and
   a generally anchor-shaped dislodging body extending from the proximal end of the handle shank, the dislodging body comprising:
      at least one fulcrum aperture aligned with a center of the width of the handle shank and a fulcrum apparatus therethrough for creating a fulcrum point when the tool is in use;
      a bottom blade, attached to a distal end of the generally anchor-shaped dislodging body and further comprising a first pick and a second pick extending in opposite directions from the bottom blade;
      a pair of dislodging blades having a concave, curved surface curving upwardly toward the proximal end of the handle; wherein the blades curve upwardly from the bottom blade to the proximal end of the handle.

2. The handheld tool of claim 1, wherein the fulcrum apparatus comprises a pair of fulcrum rollers attached to a bolt, wherein the bolt extends through the fulcrum aperture.

3. The handheld tool of claim 1, wherein at least one of the pair of dislodging blades comprises a serrated edge.

4. The handheld tool of claim 1, wherein each of the pair of dislodging blades is curved upward toward the proximal end of the handle shank, each of the pair of dislodging blades comprising a serrated curved surface.

5. The handheld tool of claim 1, wherein the bottom blade is substantially squared-off in shape.

6. The handheld tool of claim 1, wherein the bottom blade comprises a beveled outer edge.

* * * * *